Sept. 20, 1938. R. S. SANFORD ET AL 2,131,015
VEHICLE
Original Filed Feb. 6, 1932 6 Sheets-Sheet 1

INVENTOR.
ROY S. SANFORD
MONTGOMERY W. McCONKEY
BY
ATTORNEY

Sept. 20, 1938.      R. S. SANFORD ET AL      2,131,015
VEHICLE
Original Filed Feb. 6, 1932      6 Sheets-Sheet 3

INVENTOR.
ROY S. SANFORD
MONTGOMERY W. McCONKEY
BY
ATTORNEY

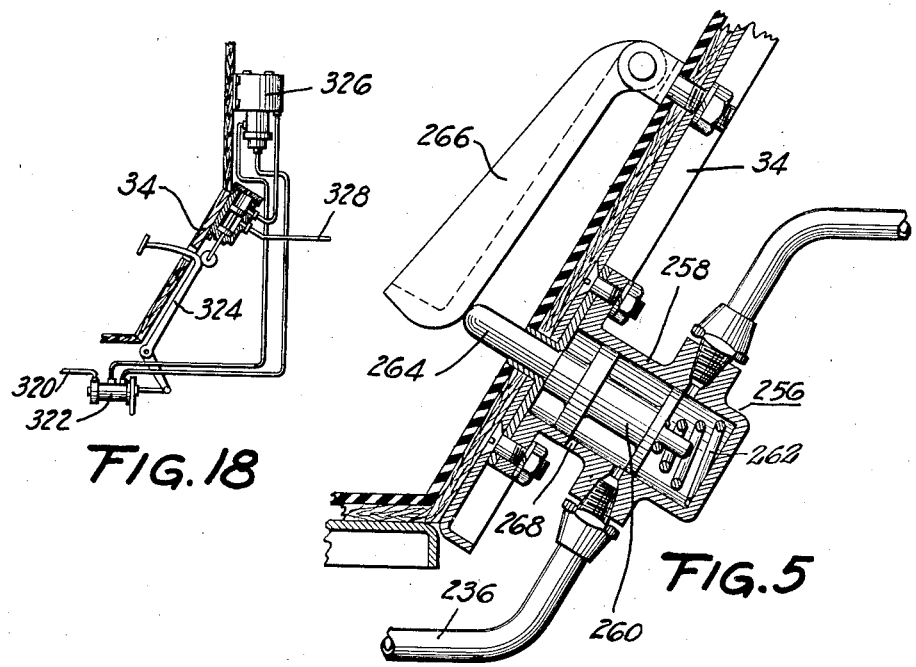
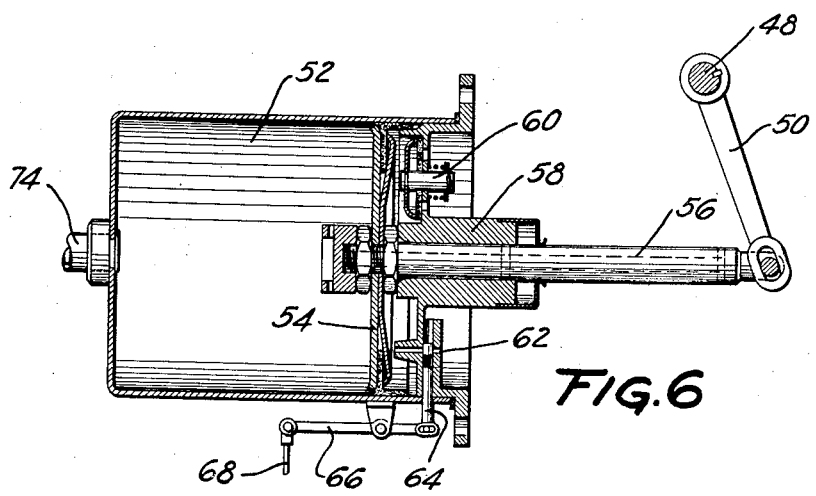

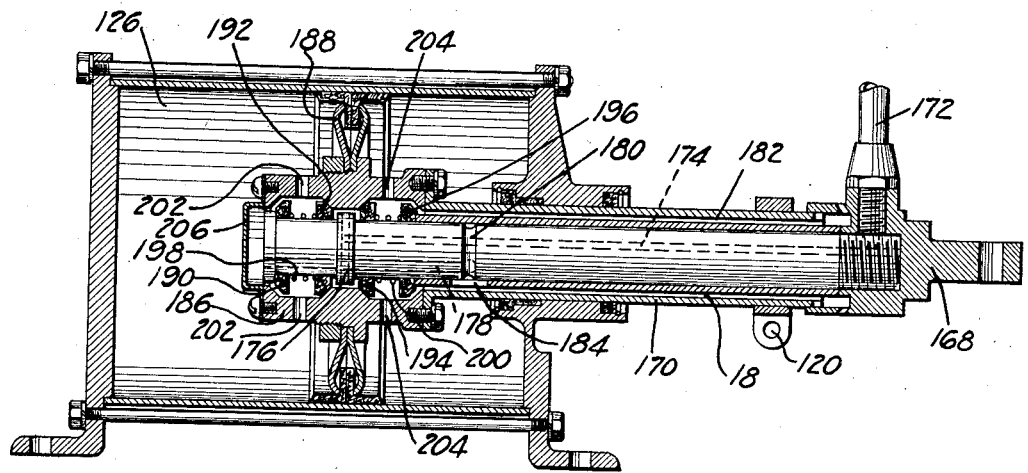
FIG.7
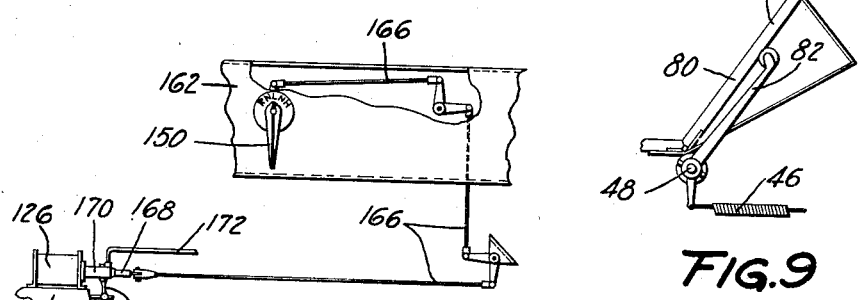
FIG.8
FIG.9
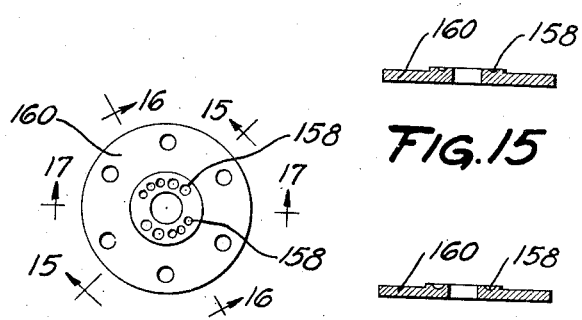
FIG.14 FIG.16
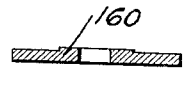
FIG.17
INVENTOR.
ROY S. SANFORD
MONTGOMERY W. McCONKEY
BY
ATTORNEY Patented Sept. 20, 1938

2,131,015

UNITED STATES PATENT OFFICE 2,131,015

VEHICLE

Roy S. Sanford, New York, N. Y., and Montgomery W. McConkey, South Bend, Ind., assignors to Bendix Aviation Corporation, South Bend, Ind., a corporation of Delaware Original application February 6, 1932, Serial No. 591,427. Divided and this application October 22, 1934, Serial No. 749,358

6 Claims. (Cl. 74—334)

This invention relates to vehicles such as automobiles, and is illustrated as embodied in the chassis of a passenger car, the particular chassis shown having individually-sprung wheels and novel power-transmitting mechanism between the engine and the drive wheels.

An important object of the invention is to simplify the controls (e. g., the controls for the speed-change or gear-shifting means, for the clutch or its equivalent, for a lock-out for a free-wheel drive, for the braking system, etc.), to reduce to a minimum the number and complexity of the operations required of the driver.

One of the principal features of the invention, which is very desirable although not necessarily associated with individual spring suspensions for the wheels, is the provision between the drive wheels of a unit (preferably supported on the chassis frame) replacing the conventional differential and not only driving the axle shafts in the general manner of a differential but also including the speed-change means or gearing.

Various features of novelty relate to arranging so that the gear-shifting is done by power, preferably derived from the vacuum of the engine intake manifold, and so that the normal second speed and direct drive, which are the only speeds used in the greater part of the driving of a car, are arranged for a separate simplified control while the low speed and reverse gears, which are used much less, are controlled by separate means readily accessible to the driver but normally out of his way.

We prefer to incorporate in the above-described unit a novel free-wheel drive between the change-speed gearing and the wheels, one of the features of which is the use of a power-operated lock-out or safety device which is not only capable of manual control but which acts automatically, if anything goes wrong, to lock out the free-wheeling action and give positive drive to the wheels and also arranged to be interconnected with the manual control so as to be automatically locked out and provide positive drive when reverse gear is selected and to automatically return to its former action when the manual control is moved to select any other speed than reverse.

In one very desirable arrangement a power-operated clutch, shown as operated by a novel vacuum power unit, is controlled by the driver, for example being actuated to throw out the clutch when the accelerator pedal is released, and preferably has associated therewith a heel pedal or the like controlling the power unit which operates the second speed-high speed gearing. In the form shown in the drawings, both second and high speeds are direct drives, although a silent gear of some kind may be used for second speed if desired.

Thus the throttle, the clutch, and most of the speed changes (i. e., all but low speed and reverse) are controlled merely by the position of the right foot. For example, in the arrangement shown in the drawings, rocking the toe upward and coming down on the heel operates (1) to slow up the engine speed, (2) to throw out the clutch, and (3) to shift from high speed (or the usual direct drive) to second speed (or from second to high, as the case may be), whereupon reversing the movement of the foot and coming down on the toe (for example as a traffic light changes from red or orange to green) operates (4) to throw in the clutch and (5) to speed up the engine. This is especially effective when the above-described free-wheel arrangement is used, as this eliminates all possibility of clashing the gears in shifting. We prefer to interlock the gear-shift with the clutch control, so that the gears cannot be shifted unless the clutch is out. The above-described arrangement, as hereinafter more fully discussed, is a modification of that described in application No. 580,434, filed December 11, 1931, by Victor W. Kliesrath and Roy S. Sanford, and the broader claims thereon are in said Kliesrath and Sanford application.

Low gear and reverse, which are used relatively seldom by most drivers, together with a fourth or extra-low speed if desired, may be obtained by a set of auxiliary change-speed gears, shown in the drawings for convenience as being of the progressive type and preferably forming a part of the above-described transmission-differential unit. These gears, according to another feature of the present invention, are shifted by vacuum or other power, shown as controlled by a novel follow-up valve pre-set by means such as a selector handle on the instrument board or steering wheel, and preferably rendered operative to shift to the selected gear by the throwing out of the clutch the next time the accelerator pedal is released.

A safety device may be provided positively to prevent unintentional pre-setting of the selector handle or its equivalent in "reverse" position so that the operator will know not to use this position before coming to a full stop because, while such a shift may be made smoothly and without clashing by the mechanism herein described (the clutch being out and the drive wheels free-wheeling), the re-engagement of the clutch with the gears in reverse and the vehicle still in forward motion would throw an undesirable strain on the entire power-transmitting system from the engine to the wheels.

Other features of the invention relate to a novel substitute for a conventional differential, arranged to drive the slower wheel rather than the wheel offering the least resistance; to the arrangement of the brakes and their operating mechanism; to the structural features of the various devices included in the combinations described above, and to other novel and desirable structures and features which will be apparent from the following description of the illustrative embodiments shown in the accompanying drawings, in which:

Figure 5 is a vertical section on a larger scale than the corresponding part of Figure 1, through part of the floorboard and through the control for the high-second gear-shift;

Figure 6 is a section, substantially horizontal, through the clutch control power unit shown in top plan in Figure 1;

Figure 7 is a section through a modified form of gear-shift power unit;

Figure 8 is a diagram showing the control of a power unit such as the one shown in Figure 7;

Figure 9 is a vertical section through part of the floorboard, showing a part of the floorboard depressible to throw out the clutch manually if the power fails;

Figure 14 is an elevation, looking in the direction of the arrows 14—14 in Figure 11, of a perforated disk forming part of the controls of both Figures 10—11 and Figures 12—13;

Figure 1:
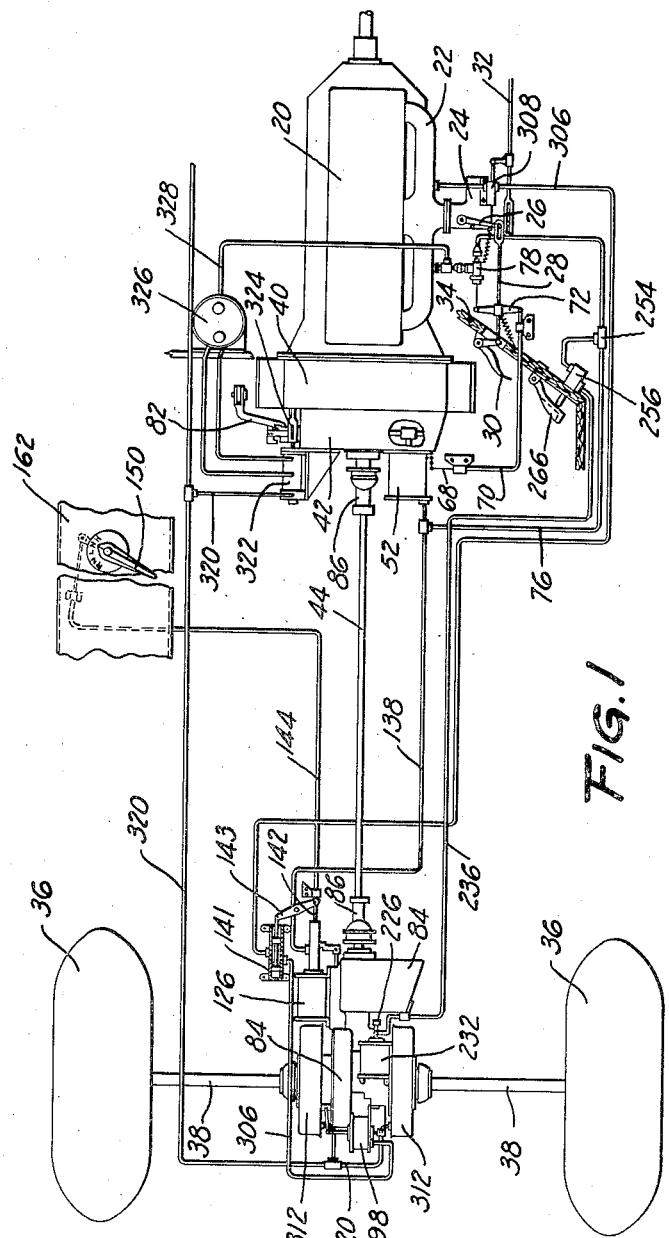
Figure 1 is a diagrammatic assembly view, mostly in plan but partly in vertical section through the floorboard and the instrument board to show some of the controls, of an automobile chassis embodying our invention.

Figures 15, 16, and 17 are sections through the disk respectively on the lines 15—15, 16—16, and 17—17 of Figure 14; and Figure 18 is a vertical section showing the brake pedal and the parts of the brake system immediately associated therewith.

The vehicle selected for illustration is an automobile chassis including an internal combustion engine 20, having the usual intake manifold 22 and carburetor 24, with the passage from the carburetor to the manifold controlled by the usual throttle valve having an operating arm 26. The throttle arm 26 is connected, by means such as a lengthwise-movable rod 28, with an accelerator pedal or the like 30, and is ordinarily also independently operable through a second lost-motion connection 32, for example, by the usual hand throttle lever on the steering column. The accelerator pedal 30 or its equivalent is pivotally mounted on the floodboard 34, for manipulation by the toe of the driver's right foot. The rod 28 has a lost-motion connection with the throttle arm 26, so that it may have a short additional motion (for manipulating the clutch-control valve described below) after the throttle is closed.

The engine is arranged to drive the vehicle by driving road wheels 36 through axle shafts 38. While not necessarily so limited, the invention is especially applicable to an arrangement in which there is no axle carrying the wheels 36, instead of which the wheels are individually sprung, with suitable universal joints at both ends of both the axle shafts 38.

The present invention has mainly to do with the power-transmitting mechanism through which the engine 20 drives the axle shafts 38 or their equivalents, and to a system of simplified controls therefor.

Immediately behind the engine flywheel and its housing 40 is arranged a clutch of any desired character, in a clutch housing 42, through which clutch the engine drives a propeller shaft 44. The clutch is operated, against the resistance of the usual clutch springs (not shown), by a clutch shaft or the like 48 (Figures 6 and 9) normally operated by a power device acting on an arm 50 secured on the clutch shaft. Spring 46 holds the manual lever 82 in the normal position shown.

The power device illustrated in Figure 6 includes a cup-shaped cylinder 52 having its open end engaging and bolted to the rear face of the clutch housing 42, over an opening therein. Within the cylinder is a suitable piston 54 shown connected to the clutch-operating arm 50 by a piston rod 56 passing slidably through a bearing in an end plate 58 closing the forward end of the cylinder 52.

The end plate 58 has a rearwardly-opening check valve 60, permitting air to enter freely between the end plate and the piston as the piston is sucked rearwardly to throw out the clutch. The end plate also has an air-exhaust passage 62, controlled by a slide valve 64 operated by a lever 66 connected by a Bowden wire 68 passing through a Bowden conduit 70 (Figure 1) and connected to a cross-bar or the like 72 mounted on the accelerator connection 28. Thus the exhaust of air from the space ahead of the piston 54, and therefore the speed of re-engagement of the clutch when the accelerator pedal is depressed, is controlled according to the extent of depression of the accelerator, and therefore substantially according to the speed of the engine.

The cylinder 52 is connected, through a fitting 74, with the intake manifold 22 by means of a conduit 76 controlled by a valve 78 operatively connected to the cross-bar 72 so that the piston 54 is automatically sucked rearwardly to disengage the clutch whenever the accelerator pedal 30 is fully or completely released. The valve 78 may be of a construction similar to that fully described and claimed in application No. 568,082, filed October 10, 1931, by Victor W. Kliesrath, and since it does not in itself form any part of the invention of the present application it will not be further described herein. It will be seen that the clutch is automatically disengaged whenever the accelerator pedal is released, and is re-engaged by depressing the accelerator pedal, the speed of re-engagement being controlled according to the engine speed.

If for any reason the above-described power clutch operator fails to work, the driver can depress a pivoted section 80 (Figure 9) of the floorboard, thereby operating an arm 82 having a one-way connection with the clutch shaft 48 and operating the clutch manually. The arm 82 is shown provided at its upper end with a roller engaging the pivoted floorboard section 80. A suitable spring 46 holds the floorboard section 80 and the arm 82 in their upper positions unless deliberately depressed by the driver.

Figure 2:
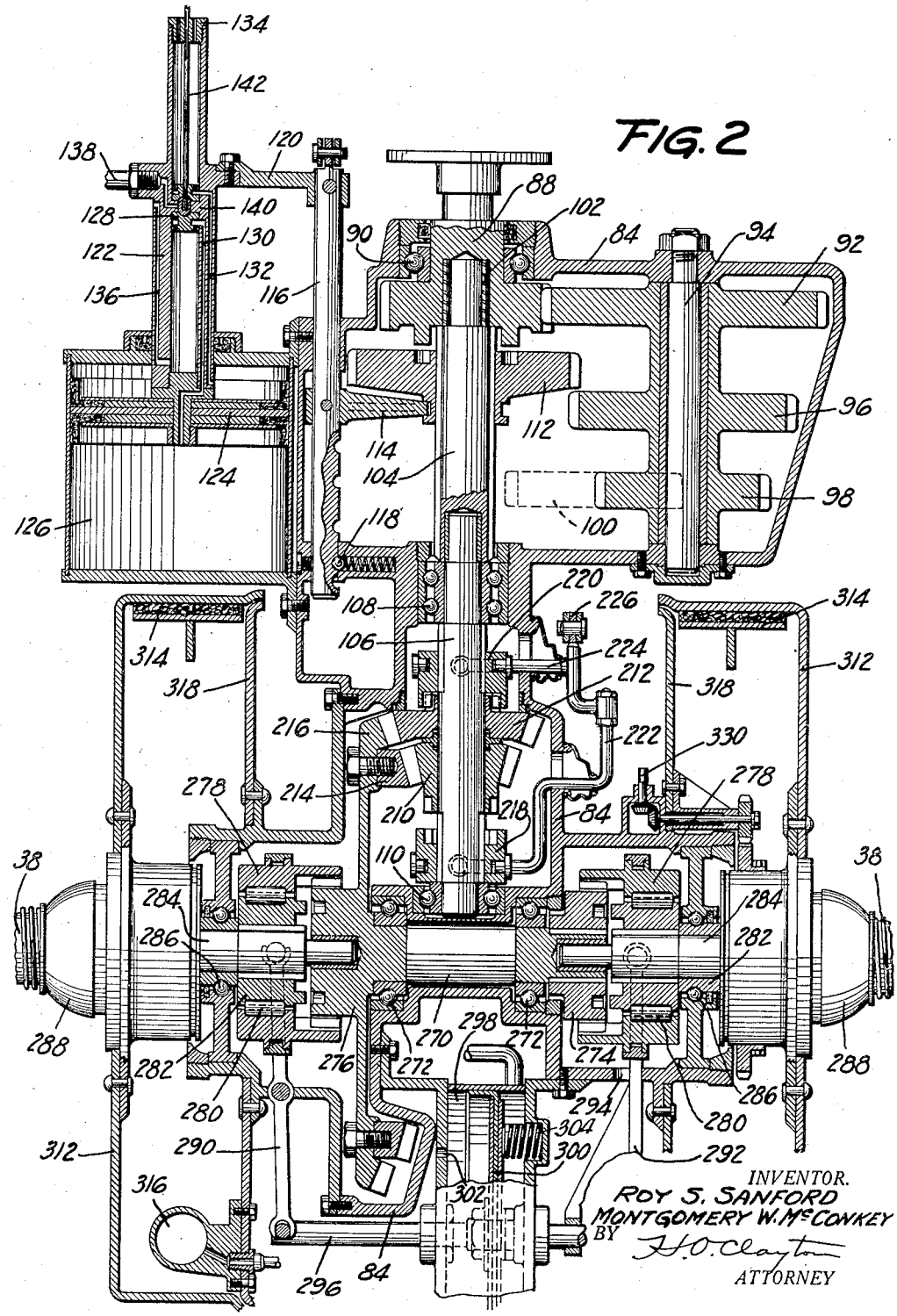
Figure 2 is a horizontal section through the novel transmission-differential unit shown in plan in Figure 1.

The propeller shaft 44 drives the rear axle shafts 38 through a novel unit, preferably supported on the chassis frame and shown in top plan in Figure 1 and in horizontal section in Figure 2, and which in the particular embodiment shown in these figures includes the following principal parts: (1) a low-speed, direct-drive, reverse, change-speed gearing with a novel vacuum power operator, (2) a high-second gearshift independent of (1) and also provided with a vacuum power operator, (3) a differential or its equivalent, being shown as one form of what is usually called a "locking differential", (4) a free-wheel drive to each shaft 38, (5) a lock-out, preferably power-operated, for the free-wheel drives, and (6) a pair of hydraulic or other brakes acting on the wheels 36 through the axle shafts 38. The above parts are all carried by, and are mostly housed within, a housing or gear-box 84 formed in suitable sections bolted together.

The propeller shaft 44 (which may if desired have universal joints 86 at its forward and rear ends) drives a short shaft 88 journalled in a bearing 90 carried by the gear-box 84, and formed at its rear end (inside the gear-box) as a small pinion meshing with and driving a large gear 92 forming part of a three-gear cluster rotatably mounted on a fixed counter-shaft 94. The gear cluster also includes a medium sized gear 96 and a small gear 98, the last-named gear meshing with a reverse idler gear 100 (carried by a removable cap above or below the plane of Figure 2, and therefore indicated in dotted lines).

Piloted in the rear end of shaft 88, in the roller bearing 102, is the forward end of a driven shaft 104 splined or keyed at its rear end to an aligned pinion shaft 106 journalled in bearings 108 and 110 carried by the gear-box 84. Splined on the driven shaft 104 is a movable driven gear 112 slidable by a suitable shifter fork 114 from the neutral position shown in Figure 2, rearwardly to mesh with gear 96 or reverse gear 100, or forwardly to bring clutch portions on its forward face into inter-engagement with corresponding clutch portions on the rear face of the pinion and shaft 88 to give direct drive (this last being the normal position of gear 112).

The shifter fork 114 or its equivalent is carried by means such as a lengthwise-slidable shifter rod 116 having a series of notches interlocking with a spring-pressed ball 118 to give the following positions, in order from the lower (rear) end of the rod: (1) direct drive, (2) neutral, (3) low gear (in mesh with gear 96), (4) neutral, and (5) reverse (in mesh with gear 100).

The shifter rod 116 is shown rigidly secured, by a cross-bar or the like 120, to a piston rod 122 carried by a double-acting piston 124 in a power cylinder 126 mounted on the gear-box 84. The piston rod 122 is hollow, and contains a slide valve 128 controlling a passage 130 opening through the piston 124 into the space below (behind) the piston, and a passage 132 opening above (ahead of) the piston.

The upper end of the hollow piston rod communicates with the atmosphere through openings in a plug 134 threaded into the end of the piston rod, and the lower end of the hollow piston rod communicates with the atmosphere through a passage 136 which opens outside the power cylinder in all positions of the piston. A flexible vacuum connection 138 opens inside the hollow piston rod through a passage 138' opening through an internal collar 140 substantially midway of the piston rod and which passage is controlled by the slide valve 128.

The valve 128 is of the follow-up type, and includes three disconnected parts: viz., upper and lower valve slides each having an annular external groove and passages therefrom leading out through the end of the slide away from the collar 140, and a central operating button with rounded ends fitting into seats in the adjacent faces of the valve slides, and which is of a size to pass easily through the collar 140, and which is carried by and secured to the end of a relatively stiff Bowden wire 142 passing through the plug 134.

In the operation of the power device just described, the valve 128 can be pre-set for any gear position desired, before suction is applied through conduit 138. If the wire 142 and button on its end are pushed downwardly (i. e., rearwardly), the lower slide valve will be pushed down to a corresponding position. This connects the vacuum conduit 138 through passage 130 with the space below (behind) the piston 124, leaving the space above (in front of) the piston connected to the atmosphere. Or if the wire is pulled upwardly (forwardly) instead, the upper valve slide is pulled in a corresponding direction, connecting the vacuum conduit 138 through passage 132 with the space above (in front of) the piston 124, leaving the space below (behind) the piston connected to the atmosphere.

When now the vacuum is applied through conduit 138, the piston 124 follows the valve until the latter regains the position of parts shown in Figure 2, thereby shifting the gears to the position for which the valve 128 was pre-set.

The Bowden wire 142 is shown passing through a Bowden conduit 144, and as being connected at its forward end to a device such as an arm 146 keyed to a shaft 148 connected to a preselector handle 150. The handle 150 is formed with a pointer passing over a scale 152 indicating the different gear positions.

A valve 141 is also connected to Bowden wire 142 through the medium of a transfer lever 143 and operates to admit atmosphere to the cylinder 298 through the rearward portion of conduit 306 when the selector valve 150 is moved into reverse position thus providing positive drive in reverse speed.

To guard against unintentional shifting into reverse, and to fix definitely the different selector valve positions, arm 146 may be pressed yieldingly by means such as a spring 154 to hold a pair of projections or balls 156 yieldingly in the opposite pair of two series of rounded depressions 158 formed on the rear face of a disk 160 fixedly mounted on the back of the instrument board 162 opposite the selector handle 150. The depressions 158 corresponding to reverse, and to the neutral position just before reverse, are deeper than the others, so that it takes a substantial effort to turn the selector handle 150 to reverse position, and the driver cannot do so unintentionally.

The conduit 138, as shown in Figure 1, is connected to the clutch control vacuum conduit 76, so that the selected shift of the gears is made by releasing the accelerator pedal, which at the same time throws out the clutch. The gear-shift and the clutch control are therefore interlocked, and it is impossible to shift the gears accidentally when the clutch is engaged.

In the arrangement of Figures 7, 8, 12, and 13, an arrangement is shown for operating the gear-shift directly from the handle 150 without pre-selection and if desired without an interlock with the clutch control, but with provision for manual shifting if the power fails.

In this arrangement the handle 150 is connected through a linkage 166 with the front portion 168 of a two-part piston rod. Portion 168 telescopes into an outer portion 170 to which the cross-bar 120 and therefore the shifter rod 116 are connected.

A vacuum connection 172, corresponding to connection 138, and which is connected to conduit 76 if an interlock with the clutch control is desired and directly to the manifold 22 if no interlock is desired, is secured to piston rod portion 168 in communication with a vacuum passage 174 opening outwardly through a collar 176 near the lower (near) end of the piston rod.

An air passage 178 runs from a groove 180 in the piston rod and opens through its lower (rear) end. Air passages 182 are provided between the telescoping piston rod sections 168 and 170, for example by making the latter a loose fit about the former, and an opening 184 provides communication between these air passages and groove 180.

The outer piston rod section 170 is secured at its lower (rear) end to a valve chamber 186 carrying a double-acting power piston 188 corresponding to piston 124. The valve chamber is formed with four conical seats for valves 190, 192, 194, 196 sleeved on the inner piston rod section 168, with a valve spring 198 compressed between valves 190 and 192, and a valve spring 200 compressed between valves 194 and 196. The collar 176 is arranged between the valves 192 and 194, and has a short lost motion before engaging either of them. The valve chamber is formed with ports 202 from the space between valves 190 and 192 to the space below (behind) the piston, and with ports 204 from the space between valves 194 and 196 to the space above (in front of) the piston. A cup-shaped cap 206 forms a chamber over the lower end of the valve chamber 186.

In operation, with the parts as shown the vacuum connection is sealed off by the valves 192 and 194, which are held against their seats by springs 198 and 200. The space above (in front of) the piston communicates with the atmosphere through ports 204, past the open valve 196, and through passages 182. The space below (behind) the piston communicates with the atmosphere through ports 202, past the open valve 190, through passage 178, groove 180, port 184, and passages 182.

If now tension is applied to connections 166, part 168 shifts upward (forward), first closing valve 196 and then (by contact with collar 176) opening valve 194, thereby opening communication between the vacuum passage 174 and the space above (ahead of) the piston. The piston then follows up until the positions shown in Figure 7 are regained. The reverse action takes place if connections 166 are manipulated to push piston rod 168 downward (rearward). In case of failure of the power, after a short lost motion the above-described connections shift the gears manually.

Figure 4:
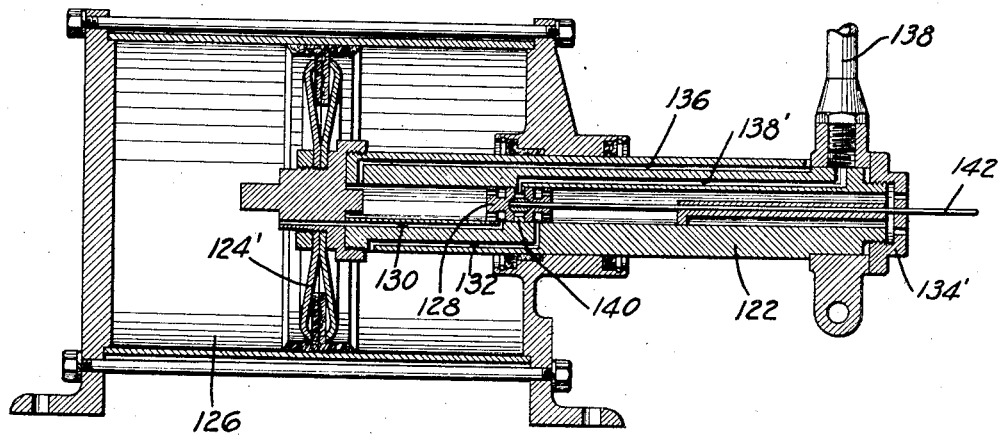
Figure 4 is a horizontal section, corresponding to the upper left-hand portion of Figure 2, of a modified form of power unit for the low-reverse gear-shift.
Figure 11:
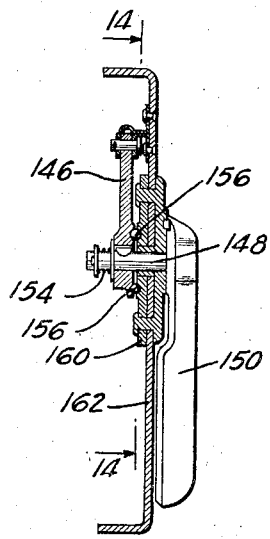
Figures 10 and 11 are respectively a front elevation and a vertical section, showing on a larger scale than Figure 1 the control for the low-reverse gear-shift.
Figure 10:
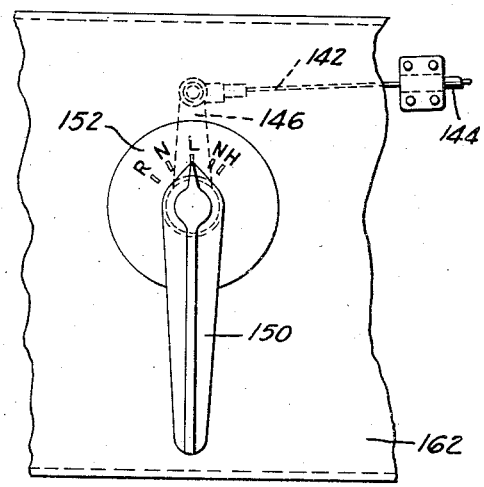
Figure 13:
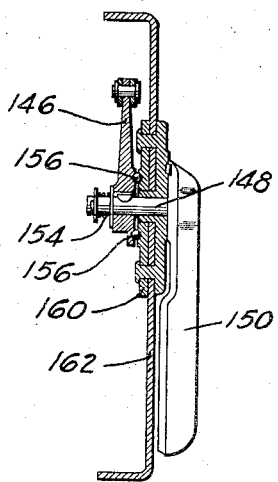
Figures 12 and 13 are similar views of the modified low-reverse control shown in Figure 8.
Figure 12:
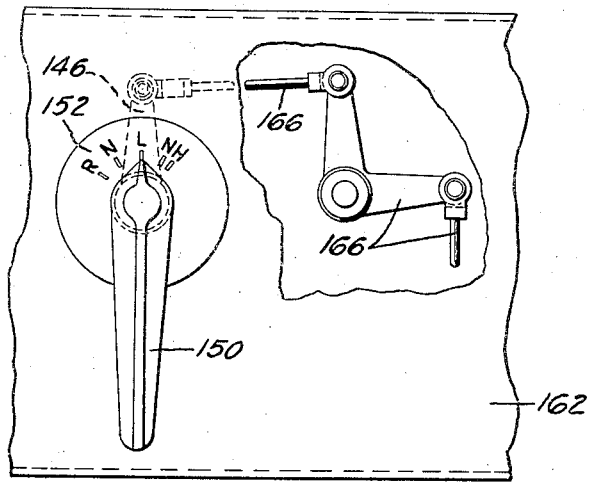

In Figure 4 is shown a modification of the power operator of Figures 1 and 2. As the operation and arrangement of the parts are the same as in Figures 1 and 2, they are designated by the same reference characters, with primes added where the structure is slightly different. The principal difference is that the connections are all made at the end of the piston rod, instead of about the center of it, thus necessitating lengthening some of the passages but shortening the assembly somewhat.

Returning now to Figure 2, the pinion shaft 106 has rotatably sleeved thereon a pair of bevel pinions 210 and 212, of different sizes meshing respectively with a pair of different sized bevel ring gears 214 and 216. Splined on the pinion shaft 106 are a pair of dog clutches 218 and 220, rigidly connected to be moved in unison by shifter forks 222 and 224 which are rigidly connected for operation by the same vertical lever 226. Shifting this assembly downwardly (rearwardly) interlocks clutch 220 with pinion 212 and gives one speed; shifting it upwardly (forwardly) interlocks clutch 218 with pinion 210 and gives a different speed.

The vertical lever 226 which operates the above described gear-shifting means has its upper end connected to a piston rod 228 operated by a double-acting piston 230 in a cylinder 232 mounted on the top of the gear-box 84. The piston rod 228 is formed with a vacuum passage 234 communicating with a flexible vacuum conduit 236, and with an air passage 238 having an air intake 240 to which a suitable extension, conduit, or air filter, may be secured if desired.

The piston 230 is mounted on a slide valve member 242 sleeved on the piston rod 228 between two abutments shown as provided by snap rings 244 and 246 seated in grooves in the piston rod. The slide valve 242 is formed with ports registrable with openings through the sides of piston rod 228. The ends of the passages 234 and 238 are closed by plugs 248. Springs 250 and 252 clipped to the opposite ends of the cylinder 232, engage the piston 230 and slide valve 242 near the opposite ends of its stroke. This power operator is more fully described and is claimed per se in application No. 580,446, filed December 11, 1931, by Roy S. Sanford and Robert P. Breese.

The vacuum line 236 is connected to a T-fitting 254 in the clutch control line 76 (to interlock this gear-shift also with the clutch control) through a valve 256 shown in detail in Figure 5. This valve includes a valve cylinder 258 bolted to the lower face of the floorboard 34 over an opening therein, and containing a valve piston 260 urged upward by a fairly stiff spring 262, and having a guide plunger 264 extending through the floorboard and engaged by a heel rest or pedal 266 pivotally mounted on the floorboard just below the accelerator pedal 30, in such a position that when the toe of the driver's right foot is on the accelerator pedal his heel is on the rest 266.

Figure 3:
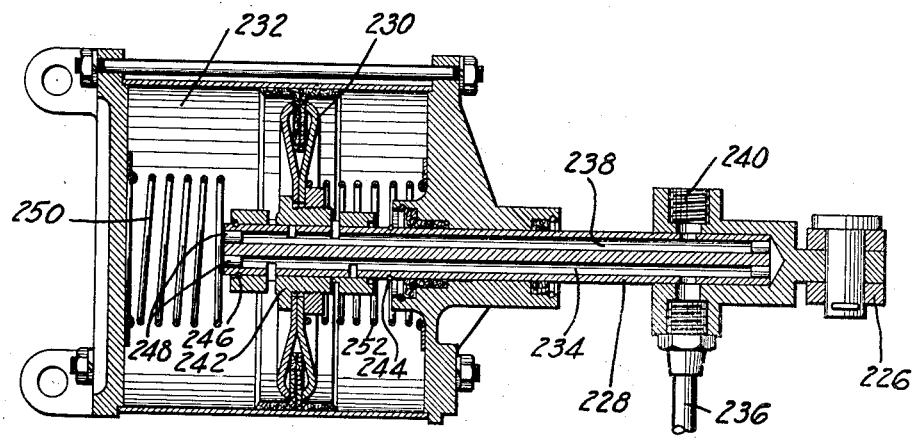
Figure 3 is a horizontal section through the high-second gear-shift vacuum unit, this unit being shown in plan in Figure 1 and being located just above the lower right-hand portion of Figure 2.

It will be seen that when the driver lifts the toe of his right foot, thereby throwing out the clutch, he may go on and depress his heel, thereby admitting vacuum to the power device of Figure 3 and shifting from whichever pinion and bevel gear he has been using to the other one and thereby in effect changing gears,—or, more accurately, changing speeds, since there is direct drive in both of these speeds.

The above-described power unit piston rod is shown in Figure 3 at the upper and foremost end of its stroke, with pinion 212 driving ring gear 216. If the valve 256 is manipulated as described above (and with the clutch control valve 78 also opened if the devices are interlocked with each other as shown in Figure 1), vacuum enters through conduit 236, passage 234, and the registering ports in the piston rod and the slide valve 242, behind the piston, while the atmosphere communicates with the space ahead of the piston through passage 238 and the registering ports in the piston rod and slide valve ahead of the piston. The piston thereupon moves toward the other extreme of its movement, engaging near the end of its stroke the spring 250, and shifting the clutch 220 out of engagement with pinion 212 and the clutch 218 into engagement with pinion 210, thereby changing speeds.

Now when the heel is raised and the suction is cut off from conduit 236, air enters through a port 268 (Figure 5) into the space behind piston 230. With the air pressures now balanced on opposite sides of piston 230, spring 250 shifts the slide valve 242 against the abutment 244, ready for the next cycle of operations.

The two ring gears 214 and 216 are bolted or otherwise secured together, and are shown by way of illustration as driving the axle shafts 38 through what is known as a "locking differential". Gear 216 is secured to, or integral with, a central shaft 270 journalled in bearings 272 in the gear-box 84. On one end of shaft 270 is keyed or splined a clutch member 274 having external splines and having clutch sockets or recesses in its outer face. There is a similar clutch member 276 keyed to or formed integrally of the hub part of ring gear 216 opposite the shaft 270.

The clutch members 274 and 276 are encircled by and splined to the external race members 278 of a pair of overrunning roller or "Horton" clutches, the wedge rollers of which are indicated at 280. The inner races 282 of these roller clutches are splined to short drive shafts 284 piloted in opposite ends of shaft 270 and journalled in bearings 286 carried by the gear-box 84, and connected to the axle shafts 38 through suitable universal joints 288 (not shown in detail). There are also, of course, universal joints (not shown) at the outer ends of the axle shafts 38 and through which the axle shafts drive the wheels 36.

It will be seen that, with the parts in the positions just described, the roller clutches 278—280—282 act as free-wheel units through which the ring gear 216 (and therefore the engine 20) can drive the wheels, although the wheels cannot drive the engine. In rounding a corner, or when from any other reason the one wheel turns faster than the other, all the power goes to the slower wheel and the faster wheel overruns or "free-wheels". On a down grade or when the motor is not driving the car, both wheels can overrun or free-wheel.

It is sometimes desirable (for example when it is desired to use the engine as a brake) to lock out the free-wheel units and provide a positive drive all the way from the engine to the wheels. Accordingly, the free-wheel or roller clutches 278—280—282 may be made axially shiftable as units, being splined on the shafts 284 and shifted by a shift member 290 pivoted on the gear-box 84 and a bodily-movable shift member 292 moving in a short slot 294 in the gear-box. These shift members shift the two roller clutches toward each other when it is desired to lock them out, whereupon clutch projections or pins on the inner ends of the parts 282 interlock in rigid clutching engagement with the clutch recesses on the outer faces of clutch members 274 and 276.

The shift members 290 and 292 are connected to opposite ends of a double-ended piston rod 296 which passes through both ends of a double-ended cylinder 298 and is secured at its center to a piston 300. The left end of cylinder 298 is vented to the atmosphere at 302. An annularly-arranged series of return springs 304 urges the piston 300 to the left, to lock out the free-wheel units.

A vacuum line 306 (Figure 1) is connected to the side of cylinder 298 opposite the air vent 302 and is controlled by a valve 308 of any desired form which connects it directly to the intake manifold 22.

While a separate control may be provided for this valve if desired, it is shown connected to the hand throttle control rod 32 which, by reason of the lost motion provided, acts successively first to close the valve 308, then to prevent actuation of the clutch control valve 78 by preventing complete release movement of the accelerator pedal, and finally gradually to open the engine throttle valve.

It will be noted that if anything goes wrong with the vacuum connections, the free-wheel lock-out described above becomes automatically operative.

Another feature of the invention relates to locating the brakes on the above-described unit, where they form part of the sprung weight, preferably between the free-wheel units 278—280—282 and the universal joints 288. As shown, the brake drums 312 are secured to and carried by the shafts 284 just outside the gear-box 84. Suitable internal brakes 314, shown actuated by hydraulic cylinders 316 but which may be of any desired character, are carried by backing plates 318 secured to the opposite sides of the gear-box 84.

The brakes illustrated form part of a four-wheel brake system connected by hydraulic lines 320 to a master cylinder 322 (Figure 18) operated by a service brake pedal 324. The master cylinder shown is also connected to a supply reservoir 326 which also contains an auxiliary vacuum power brake-applying means having a vacuum line 328 connected to the intake manifold. This arrangement is more fully described and is claimed per se in application No. 609,716, filed May 6, 1932, by Roy S. Sanford and Eugene G. Carroll.

In Figure 2, a speedometer drive 330 is shown driven from one of the shafts 284 by suitable gear-and-shaft connections.

This application is a division of our copending application Serial No. 591,427, filed February 6, 1932.

While various particular constructions have been described herein in detail, it is not our intention to limit the scope of the invention to those particular constructions, or otherwise than by the terms of the appended claims.

We claim:

1. A vehicle comprising an engine having a source of differential fluid pressure, an accelerator pedal, driving wheels, means to transmit power from the engine to the driving wheels, said means including a change-speed mechanism positioned between the wheels operable to transmit power from the engine to the driving wheels as a direct drive when operating in second and high speeds, power means including a differential fluid pressure actuated motor to selectively actuate the speed-change mechanism, and means including a heel actuated pedal positioned adjacent the accelerator pedal for actuating said power means.

2. A vehicle comprising an engine having a source of differential fluid pressure, an accelerator pedal, driving wheels, means to transmit power from the engine to the driving wheels, said means including a change-speed mechanism positioned between the wheels operable to transmit power from the engine to the driving wheels as a direct drive when operating in second and high speeds, power means including a differential fluid pressure actuated motor to selectively actuate the speed-change mechanism, means including a heel actuated pedal positioned adjacent the accelerator pedal for actuating said power means, and means including a manually operable control to pre-select any desired speed, said means requiring an increased force to select reverse gear.

3. A vehicle comprising an engine having a source of differential fluid pressure, an accelerator pedal, driving wheels, means to transmit power from the engine to the driving wheels, said means including a change-speed mechanism positioned between the wheels operable to transmit power from the engine to the driving wheels as a direct drive when operating in second and high speeds, power means including a differential fluid pressure actuated motor to selectively actuate the speed change mechanism, means including a heel actuated pedal positioned adjacent the accelerator pedal for actuating said power means, and means including a manually operable control to pre-select any desired speed, said means requiring an increased force to select reverse gear, said change-speed mechanism operating to drive the slower wheel rather than the wheel offering the least resistance.

4. In an automotive vehicle provided with an engine and driving wheels, a change-speed transmission mechanism, a clutch mechanism interconnecting said engine and transmission, and other clutch mechanisms interconnecting said transmission and wheels, power means for operating the transmission mechanism only after the aforementioned clutches have been disengaged, and means for controlling the operation of said power means comprising two separate selector valve mechanisms.

5. In an automotive vehicle provided with an engine and driving wheels, a change-speed transmission mechanism, a clutch mechanism interconnecting said engine and transmission, and other clutch mechanisms interconnecting said transmission and wheels, power means for operating the transmission mechanism only after the aforementioned clutches have been disengaged, and means for controlling the operation of said power means comprising two separate manually operable selector valve mechanisms, both of said valve mechanisms being capable of operation prior to a disengagement of said clutches to thereby provide means for preselecting an operation of the transmission.

6. In an automotive vehicle comprising an engine, an accelerator, and drive wheels, two interconnected change-speed transmission units serving to in part interconnect said engine and wheels, power means for operating said units, manually operable selector units for controlling the operation of said power means, and accelerator operated means for in part controlling the operation of said power means, said means comprising two separate motors, each of the aforementioned units being operated by one of said motors, and fluid transmitting mechanism so interconnecting said motors and engine as to place said motors in parallel relation in the fluid circuit.

ROY S. SANFORD.
MONTGOMERY W. McCONKEY.